United States Patent [19]

Daswick

[11] E Re. 31,173

[45] Reissued Mar. 15, 1983

[54] SPORTING SHOE

[76] Inventor: Alexander C. Daswick, 647 Orange Grove, South Pasadena, Calif. 91030

[21] Appl. No.: 67,362

[22] Filed: Aug. 17, 1979

Related U.S. Patent Documents

Reissue of:

[64] Patent No.: 4,030,213
Issued: Jun. 21, 1977
Appl. No.: 728,211
Filed: Sep. 30, 1976

[51] Int. Cl.[3] ..... A43B 13/12; A43B 5/00

[52] U.S. Cl. ..... 36/30 R; 36/32 R; 36/103; 36/114

[58] Field of Search ..... 36/83, 114, 103.1, 32 R, 36/30 R, 28, 29, 25 R, 91

[56] References Cited

U.S. PATENT DOCUMENTS

| | | | |
|---|---|---|---|
| 2,435,976 | 2/1948 | Monagin | 36/30 R |
| 2,606,105 | 8/1952 | Wells | 36/1 |
| 2,810,213 | 10/1957 | Jonas | 36/1 |
| 3,964,181 | 6/1976 | Holcombe | 36/91 |

*Primary Examiner*—Patrick D. Lawson
*Attorney, Agent, or Firm*—Gene W. Arant

[57] ABSTRACT

[The present invention relates to certain novel and valuable improvements in sporting shoes used for running or jogging.]

*A sporting shoe has a relatively rigid sole whose longitudinal center portion is convexly curved in a longitudinal direction to form a pedestal about which the shoe rotates. It also has resilient sole portions at the heel and toe.*

3 Claims, 2 Drawing Figures

SPORTING SHOE

Matter enclosed in heavy brackets [ ] appears in the original patent but forms no part of this reissue specification; matter printed in italics indicates the additions made by reissue.

An object of this invention is to provide the athlete with a sporting shoe which will reduce the time and energy required to run or jog while resulting in a running or jogging movement more comfortable than has been possible in the past.

A further object of this invention is to accomplish a more effective distribution of the athlete's weight along the entire length of the shoe as it makes contact with the running surface, thus aiding in the prevention of physical injury to portions of the lower extremities.

The invention may be more fully understood by referring to the annexed drawings and descriptions hereinafter given.

DRAWING SUMMARY

Figure 1:
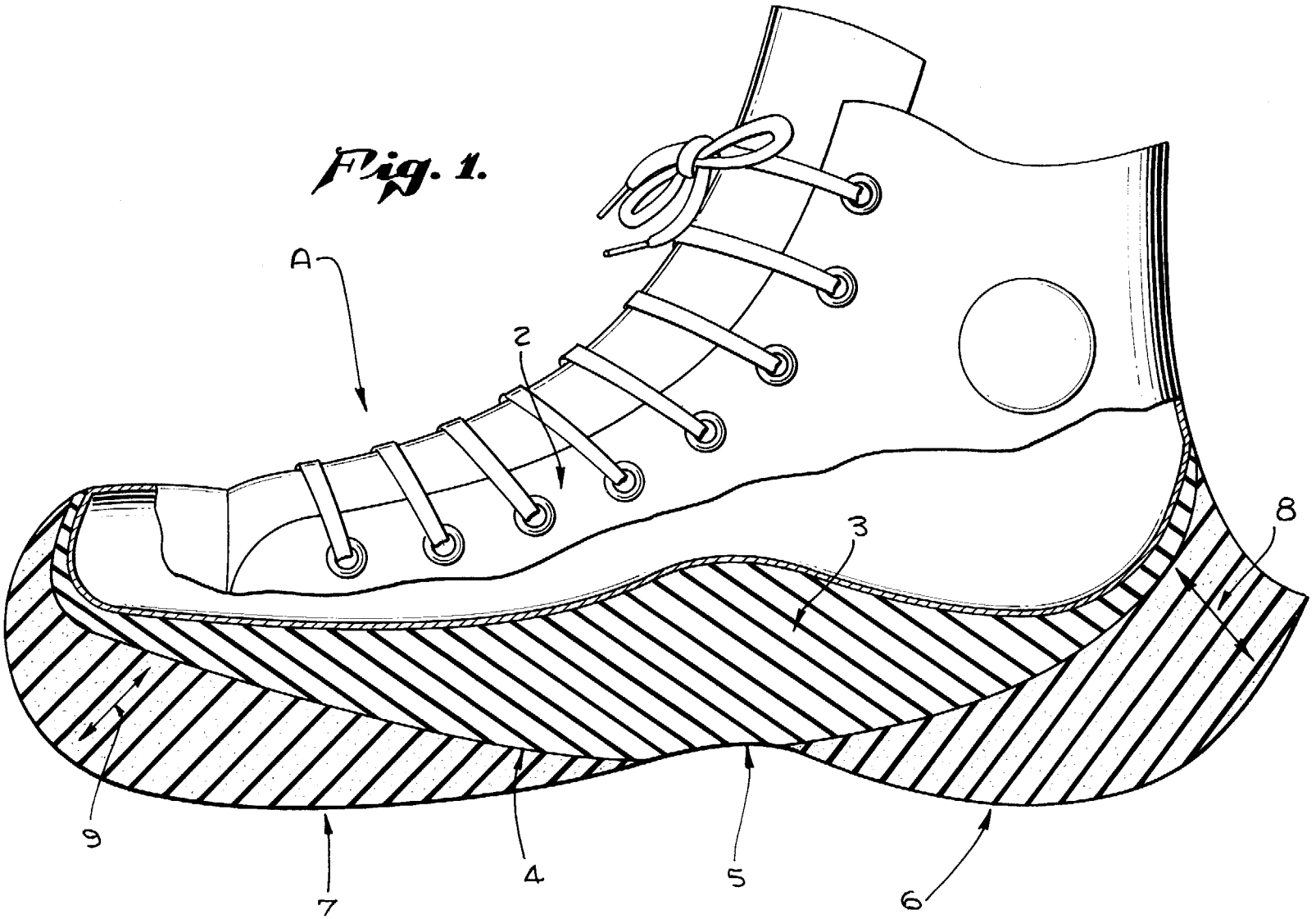
FIG. 1 is a side view, partially in cross-section, of a shoe made in accordance with the preferred embodiment of this invention.

FIG. 1 illustrates a shoe A having a housing or upper portion 2 and a relatively rigid sole 3. The housing or upper part 2 is made from soft materials in a conventional fashion. The rigid sole 3 is preferably made of hardened rubber but may also be made of any other type of relatively rigid material. The bottom surface 4 of the sole 3 is convexly arcuately curved in a longitudinal direction so that its longitudinal center portion provides a pedestal 5.

A first resilient auxiliary sole member 6 is secured to the heel portion of the rigid sole 3, and is preferably made of a highly resilient rubber or other elastomeric material. A second resilient auxiliary sole member 7 is secured to the toe portion of the rigid sole 3 and also extends underneath the area where the ball portion of a wearer's foot will be located. The auxiliary sole members 6 and 7 are spaced apart sufficiently to leave the pedestal 5 of the rigid sole 3 exposed to direct contact with a running surface. Resilient sole member 6 is of substantial thickness underneath the rearward extremity of the rigid sole 3 and its under surface is convexly arcuately curved even more than the surface 4 of the rigid sole 3.

Both the forward extremity of the rigid sole 3 and the forward extremity of the auxiliary sole member 7 are curved upwardly in front of the toe portion of the shoe housing or upper part 2. Sole member 7 is relatively thick underneath the toe portion of the shoe, and its bottom or outer surface is curved to form nearly a half circle at the forward extremity of the shoe. However, the rearward extremity of the sole member 7 has a relatively flat under surface and a substantially triangular cross-sectional configuration which tapers down to zero thickness just forward of the pedestal 5.

When the shoe A of FIG. 1 is worn by a runner the runner may land upon a running surface [with] *at* the heel portion of the rigid sole 3. If so, the runner's foot and the entire shoe will then roll forward in a pivotal movement about the pedestal 5. Initial contact of the shoe with the running surface occurs at the rearward extremity of resilient [shoe] *sole* member 6, which is then compressed in a direction shown by double-headed arrow 8. As the shoe rolls forward on the rigid sole 3 the direction of compression within the resilient material of sole member [8] *6* changes as a continuous function. Before the runner springs off the surface again the resilient sole member 7 comes into contact with the running surface and the resilient sole member 6 is lifted away from it. The direction of compressive force within the auxiliary sole member 7 changes continuously until it finally approximates that shown by the double-headed arrow 9, shortly before the runner uses his toes to spring away from the running surface.

The auxiliary sole members 6 and 7 are secured to the rigid sole 3 along its curved surface 4 by cement, staples, tacks or other means having sufficient binding or securing capabilities. The sole 3 is attached to housing 2 by any conventional means.

The resiliency of the lower heel portion 6 acts to cushion the impact created by the runner's foot as it makes initial contact with the running surface, and furthermore, this resiliency in conjunction with the rigidity of the sole 3 and the shapes of the various sole portions enables the athlete to spring forward with greater ease and comfort than could have been experienced by him in the past. Thus, the initial compression of the lower toe portion 7 provides stored energy which then aids the runner in springing away from the running surface.

The rigid sole 3 is, in a mechanical and functional sense, an internal structure which serves to support the weight of the runner in a relatively constant fashion as the angular relationship between his foot and the running surface changes. Specifically, as the entire shoe and the runner's foot rolls forward in a pivoting movement about the pedestal 5, the support of the foot itself by the rigid sole 3 remains relatively unchanged.

Figure 2:
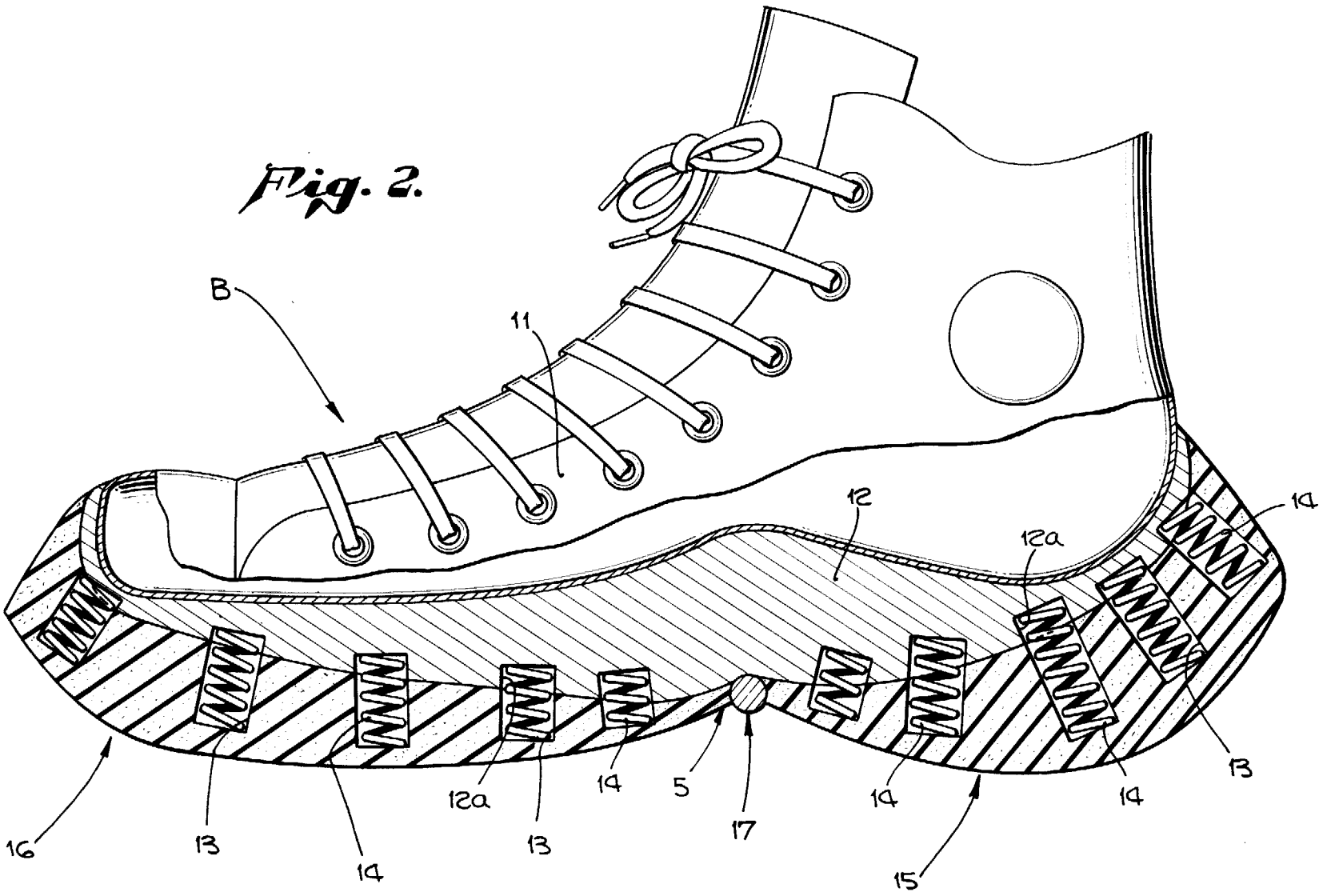
FIG. 2 is a side view partially in cross-section, of a variation of the invention of FIG. 1.

FIG. 2 illustrates a variation of the present invention, a shoe B wherein the housing or upper portion 11 may be identical to that of the prior embodiment, and the rigid sole 12 is identical or closely similar in configuration to the rigid sole 3. The rigid sole 12, however, is preferably constructed of a light metal alloy and hence is both stronger and more rigid than the sole 3 of FIG. 1. A resilient heel member 15 is of generally similar configuration to the sole member 6, while a resilient toe member 16 is of configuration generally similar to that of the sole member 7, except that the auxiliary members 15 and 16 have inner portions which meet at the location of the pedestal 5. A hinge 17 pivotally secures the inner end portions of the sole members 15, 16 to the rigid sole 12.

Each of the sole members 15, 16 has a plurality of vertical recesses 13 formed in its upper surface, and a coil spring 14 is received in each one of the recesses. Corresponding to each recess 13 in one of the resilient sole members 15, 16 is a shallow recess 12a in the rigid sole 12 which receives the upper end of the coiled spring 14 and holds it in position. Thus the coiled springs 14 enhance the compressive and expansive ability of the resilient sole members 15, 16 in and of themselves, and at the same time the hinge 17 serves to guide and confine the movement of the sole members 15, 16 and also prevents lateral slippage or displacement of the springs while they are performing their function of compression and expansion.

The invention has been described in considerable detail in order to comply with the patent laws by providing a full public disclosure of at least one of its forms. However, such detailed description is not intended in any way to limit the broad features or principles of the invention, or the scope of patent monopoly to be granted.

What is claimed is:

1. A sporting shoe comprising:

an upper housing;

a relatively rigid sole disposed beneath and secured to said housing[, the bottom surface of said sole being convexly arcuately curved in a longitudinal direction so that its longitudinal center portion provides a pedestal, whereby when a runner wearing the shoe lands upon a running surface with the heel portion of said sole the runner's foot and the shoe will then roll forward in a pivotal movement about said pedestal];

a first resilient auxiliary sole member secured to the heel portion of said rigid sole; and a second resilient auxiliary sole member secured to the toe portion of said rigid sole*; and*

*the bottom surface of said rigid sole being convexly arcuately curved in a longitudinal direction so that its longitudinal center portion provides a pedestal;*

*whereby when a runner wearing the shoe lands upon a running surface by engaging same with said first auxiliary sole member, the runner's foot and the shoe will then roll forward in a pivotal movement about said pedestal.*

2. A shoe as in claim 1 wherein said auxiliary sole members are spaced apart sufficiently to leave said pedestal exposed to direct contact with the running surface.

3. A shoe as in claim 1 wherein said auxiliary sole members have inner end portions which meet at the location of said pedestal; and which further includes means pivotally securing said end portions to said pedestal.

* * * * *